Jan. 8, 1963 R. J. GUGLIELMO, SR 3,072,497
METHOD OF COATING FORAMINOUS MATERIALS AND RESULTANT ARTICLE
Filed Aug. 5, 1958 2 Sheets-Sheet 1

INVENTOR.
Richard J. Guglielmo
BY
S.C. Yuter
ATTORNEY

Jan. 8, 1963   R. J. GUGLIELMO, SR   3,072,497
METHOD OF COATING FORAMINOUS MATERIALS AND RESULTANT ARTICLE
Filed Aug. 5, 1958   2 Sheets-Sheet 2
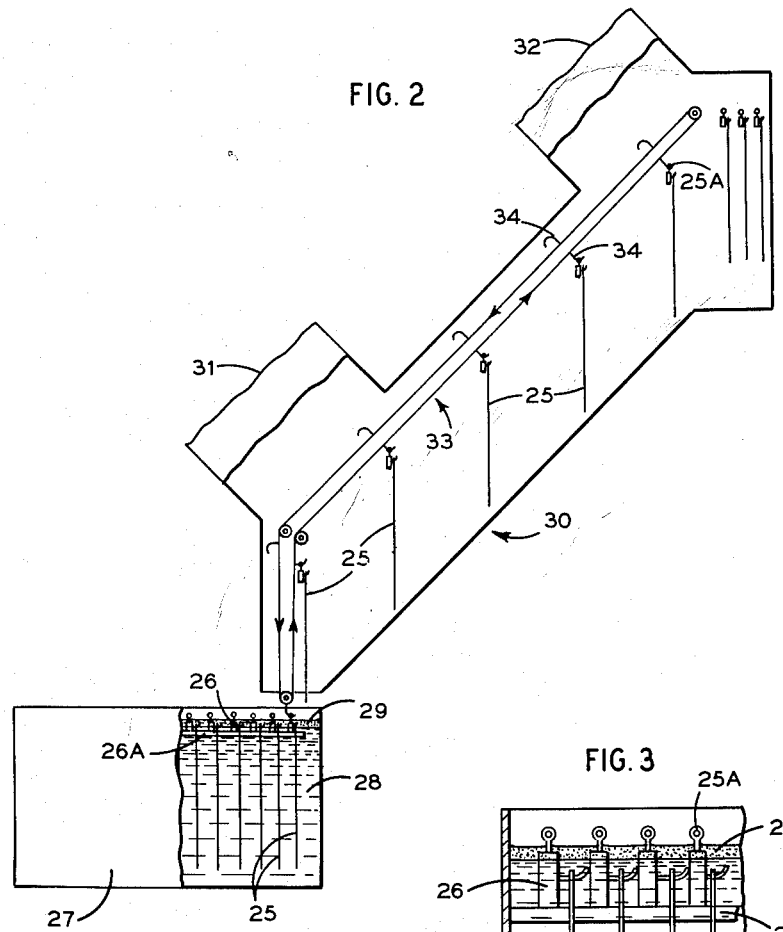
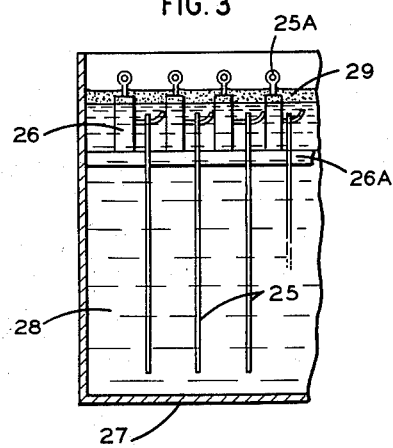
INVENTOR.
Richard J. Guglielmo
BY
S.C. Yuter
ATTORNEY United States Patent Office 3,072,497
Patented Jan. 8, 1963

3,072,497
METHOD OF COATING FORAMINOUS MATERIALS AND RESULTANT ARTICLE
Richard Joseph Guglielmo, Sr., Cresskill, N.J., assignor of fifty percent to Arthur L. Barber, Jr., Alpine, N.J.
Filed Aug. 5, 1958, Ser. No. 753,291
10 Claims. (Cl. 117—47)

This invention relates to the application of plastic coatings to bases and sheets, and the resultant articles. This invention is particularly useful in connection with bases having openings, i.e., foraminous materials.

Foraminous materials such as wire mesh, nettings and the like have been associated with various plastic materials including transparent and translucent synthetic resins, in order to embed the foraminous material in the plastic material and to close the openings of the foraminous material.

This has been accomplished by coating or laminating procedures. When the size of the openings in the foraminous material is substantial, the coating procedure becomes impractical, principally because of the inability of the applied coating to span and close the openings. In such case, resort must be had to laminating procedures wherein preformed sheets of plastic enclose the foraminous sheet. Such laminating procedures necessarily involve high production costs as compared to those in coating procedures.

Furthermore, in conventional laminating and coating procedures, it is difficult to obtain good bonds between the plastic material and the foraminous or mesh sheet, inasmuch as air occlusions which have a tendency to locate at the interface of the plastic and the sheet material defining the openings result in poor adherency. This is particularly true with coatings of high viscosity where air is entrained in the coating material as the foraminous sheet enters the coating bath or feeding rollers.

With laminating techniques, it is quite difficult to avoid air spaces between the plastic lamina and the intervening mesh material, particularly along the edges of the voids in the mesh material. Attempts have been made to overcome the inherent disadvantages of laminating procedures by precoating the foraminous material before application of the preformed plastic sheeting, but this, necessarily, further increases production costs and does not altogether avoid some air occlusions where adherency is effected.

Accordingly, an object of this invention is to provide an improved process of applying plastic coatings to foraminous bases and sheets, nettings, mesh materials and the like, in a manner to substantially eliminate air occlusions and thereby markedly increase the adherency of the plastic material to the surface portions of the base or sheet which also results in protection of foraminous sheets and bases of a metallic nature from oxidation.

Another object of this invention is to provide an improved process for coating foraminous sheets with plastic materials whereby the openings in said sheets are continuously spanned by the coating irrespective of the size of said openings, yet utilizing a minimum amount of coating material to achieve such spanning operation.

A further object of this invention is to provide a plastic coating procedure of the character described, particularly applicable to foraminous bases or sheets having openings of substantial size, wherein high viscosity coatings may be used to achieve a continuous span of the openings and still obtain good adherency of the plastic material with respect to the foraminous material and with a substantial elimination of air occlusions, Other objects of this invention will in part be obvious and in part hereinafter pointed out.

In the drawing,

FIGURE 2 shows a variation of the procedure of FIGURE 1;

FIGURE 3 is a partial elevational view of the tank shown in FIGURE 2;

The instant invention comprises essentially the application of plastic coating materials made of selected synthetic or natural resins, rubbers, or the like which may produce transparent, translucent or opaque coatings, to foraminous bases and sheets. The plastic coating material is contained within a suitable tank and maintained in liquid form by means of solvents or a gel which is made fluid by heat, the viscosity of the coating material being correlated to the nature of the base or sheet to be coated (i.e., the size of the voids in the foraminous sheets).

On the surface of the coating material there is deposited a supernatant layer of liquid material which is substantially immiscible with the coating material under coating conditions, and which has a viscosity markedly less than that of said coating material. Suitably, such liquid cover layer may be a solvent or combination of solvents. Alternatively, other liquids may be used which are substantially immiscible with the coating material under coating conditions and will not adversely affect the coating material.

The foraminous material to be coated may be in continuous-sheet form, plates, or other suitable form, such as hardware cloth having openings therein, which openings are to be closed by the plastic coating. The foraminous material is continuously passed into the coating bath, but initially passes through the supernatant solvent cover layer before contacting the plastic material to avoid entrainment of air or gases. The foraminous material passes through the bath at a selected rate of travel and then passes out of the bath, and again passes through the cover layer before emerging from the coating bath to wash the surfaces of the fresh plastic coating to aid in the drying of the coating and solvent release.

It is preferable to use a supernatant solvent or cover layer of lesser vapor pressure than that used in the gel material. By using a solvent of lesser vapor pressure than that used in the coating gel, the pores of the plastic film are held open in order to permit the release of the solvents in the gel itself. (This permits the plastic coating, in effect, to dry from the inside out and prevents the formation of a skin at the plastic air interface, which would serve as a barrier to the evaporation of the solvent in the coating.)

Figure 1:
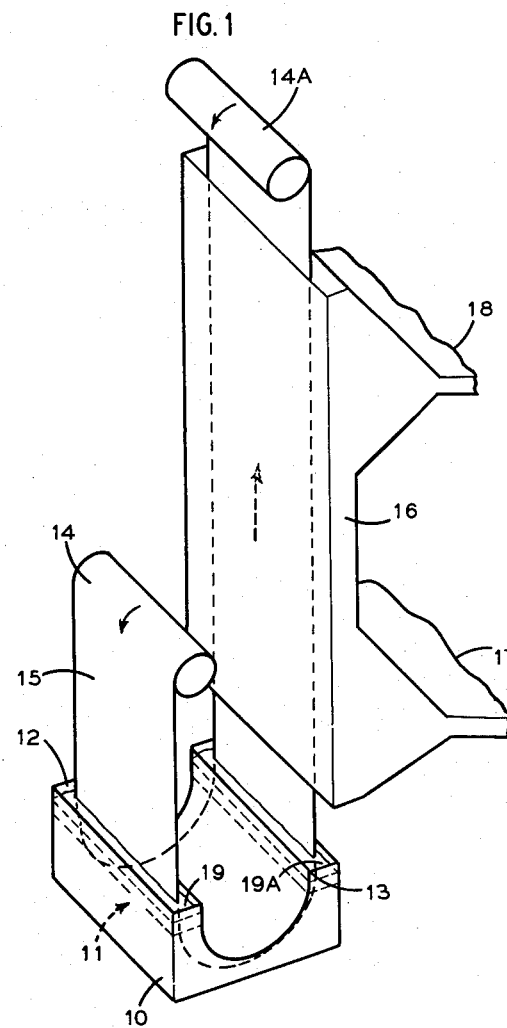
FIGURE 1 is a diagrammatic representation of a coating procedure embodying the invention.

Thus, as shown in FIGURE 1, 10 designates a tank which contains plastic coating material 11 of selected formulation. The tank 10 may have a restricted inlet portion 12 and a restricted outlet portion 13. A roll of foraminous material to be coated, such as metal wire mesh, indicated at 14 is suitably mounted for continuous unrolling to pass sheet portions 15 thereof downwardly into tank 10 by way of inlet 12, through the plastic material 11 and then upwardly through tank outlet 13, continuing upwardly through a drying chamber 16 which is provided with a warm-air inlet 17 and an air outlet 18 for carrying the drying air and entrained solvents to a solvent recovery installation not shown. The coated foraminous material is rolled up, as at 14A.

In the inlet portion 12 of tank 10 there is floated a cover layer of solvent 19 which is selected so as to be substantially immiscible with coating material 11 at coating temperatures. A similar layer of cover solvent 19A may also be floated on the coating material 11 in outlet portion 13.

Thus, the downwardly moving foraminous sheet material 15 first passes through cover layer 19 before contacting the plastic coating material 11, and the plastic-coated material is subjected to a washing action by solvent layer 19A as is emerges from tank 10.

By way of illustration, plastic coating material 11 may have the following formulation:

| | Parts by weight |
|---|---|
| Ethyl cellulose (50 cps. N-type) | 28.0 |
| Toluol | 57.0 |
| Denatured alcohol | 14.0 |
| Xylol | 5.0 |
| Tricresyl phosphate | 1.5 |
| Chlorinated diphenyl (Aroclor #5460) | 4.0 |

The cover layers 19 and 19A were made up of toluol.

Figure 4:
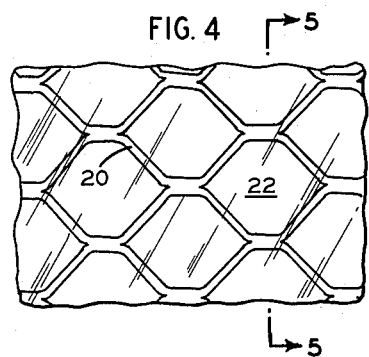
FIGURE 4 is a plan view of a coated foraminous perforated sheeting made in accordance with the invention.
Figure 5:
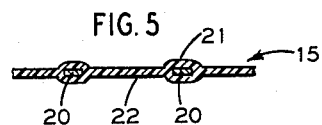
FIGURE 5 is a sectional view taken on the line 5—5 of FIGURE 4.

Sheet material 15 was in the form of expanded carbon steel mesh having interstices measuring 2" across. The resultant coated material is shown in FIGURES 4 and 5 wherein the flat web portions 20 are well embedded in resin 21 and the mesh openings are continuously spanned by clear coating portions 22.

The drier 16 is suitably operated at temperatures of from 100° to 120° F., with constant air circulation to remove saturated solvent vapors, which aids drying and contributes to efficient solvent recovery.

Figure 6:
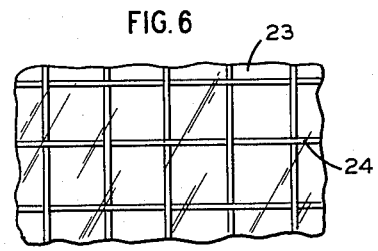
FIGURE 6 is a plan view of a coated sheeting made up of interwoven metal wire.
Figure 7:
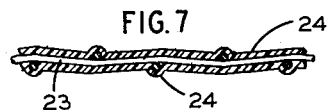
FIGURE 7 is a transverse section thereof.

In FIGURES 6 and 7 there is shown interwoven wire mesh 23 embedded in plastic 24 to provide a good span for openings measuring one-half inch and made by the above described procedure.

It is understood that the coating formulation is selected to have a viscosity proportional to the size of the openings in the foraminous material to be coated. Thus, for sheetings having openings not exceeding one-half inch in size, the following formulation was used:

| | Parts by weight |
|---|---|
| Ethyl cellulose (50 cps. N-type) | 25.0 |
| Toluol | 52.5 |
| Denatured alcohol | 18.8 |
| Xylol | 3.7 |
| Chlorinated diphenyl (Aroclor #5460) | 3.0 |
| Chlorinated diphenyl (Aroclor #1254) | 3.0 |
| Phthalocyanine green pigment | 1.2 |

In this case, toluol is also used as the cover layer 19 and 19A. Bond was found to be excellent and good span of the openings was achieved with a minimum amount of coating per unit of surface area.

Various synthetic resins may be used in formulating suitable coatings. Thus, the following formulation was used on one-half inch metal mesh fabric (hardware cloth):

| | Parts by weight |
|---|---|
| Cellulose acetate butyrate (½ sec.) | 35.0 |
| Acetone | 5.0 |
| Denatured alcohol | 10.0 |
| Toluol | 40.0 |
| Tris B chlorethyl phosphate | 5.0 |
| Aluminum pigment 40XD (Reynolds metals) | 5.0 |

The cover layers 19 and 19A were made up of 80% toluol and 20% acetone.

Also, the following formulation was based on a mixture of thermoplastic and thermosetting resins and applied to one-quarter inch metal mesh fabric (hardware cloth):

| | Parts by weight |
|---|---|
| Mixed acrylic ester polymers (Acryloid B-72) | 35.0 |
| Vinyl copolymer | 15.0 |
| 60% urea formaldehyde resin in (1:1) xylol and butanol | 10.0 |
| Methyl ethyl ketone | 20.0 |
| Toluol | 30.0 |

The cover layers 19 and 19A were made up of a mixture of xylol and toluol with methyl isobutyl ketone. The coated sheet was dried at temperatures effective to cure the thermosetting resin.

The instant invention is applicable to elastomeric coatings for foraminous sheetings, as indicated in the following formulation, which was applied to wire screening having openings of substantial size:

| | Parts by weight |
|---|---|
| Chlorinated rubber (20 cps.) | 75.0 |
| Tricresyl phosphate | 20.0 |
| Epoxy resin-Bakelite ERL 2774 (stabilizer) | 5.0 |
| Toluol | 75.0 |
| Acetone | 25.0 |

Toluol was used as the cover layers for the coating bath.

The invention herein may be used to coat individual foraminous plates, as shown in FIGURE 2. Thus, perforated sheets of metal 25 are suspended on hangers 26 having eyes 25A and supported within a coating tank 27 on ledges 26A. Plastic coating material of suitable formulation is poured into the coating tank, as at 28, and a cover layer 29 is floated on the surface of bath 28. The plates 25 may be left in the tank 27 for a determined time interval, and then brought to a position adjacent an inclined drier 30 having a hot air inlet 31 and an outlet 32 for carrying vapors to a recovery system, not shown.

An endless conveyor 33 is arranged in drier 30 with hooks 34 on said conveyor. The plates 25 are withdrawn from bath 28, passing upwardly through cover layer 29, by lifting hangers 26 and mounting the eyes 25A thereof on conveyor hooks 34. At the upper end of drier 30 the coated plates 25 are removed from conveyor 33. The drippings from drier 30 will flow back into tank 27.

The process of the instant invention is applicable to foraminous materials of all kinds including metallic and non-metallic materials. Thus, sheets of cotton, linen, synthetic textile fabrics such as nylon, Dacron and the like, having openings of various sizes, may be coated with and embedded in plastic coatings derived from thermoplastic, thermosetting or mixed resins, including vinyl copolymers, polystyrene, polyisobutylene, cellulose ethers, polyesters, phenolics, urea, formaldehyde, epoxy and other resins, as well as elastomeric materials.

The foraminous material may be made by textile operations in the form of woven cheesecloth, nettings and the like, or may be made by perforating sheet material such as paper, metal, foil and the like.

It has been found that the procedure is particularly adapted to coating foraminous materials having large openings, which may measure up to two and one-half inches or more in size. It is understood that with material having voids of substantial size, the coating formulations must be selected to have high viscosities so as to insure good spanning of the openings. Also, for such large size openings, the cross-section of the material defining the openings should have maximum peripheral surface to insure adequate surface area for carrying the coating material.

The supernatant cover layer used on the coating bath is selected in terms of its compatibility with the specific nature of the coating material (solvent and resins) and the solvents used in preparing the coating material. Since the cover layer must be substantially immiscible with the plastic coating, the selection of said cover layer is predicated on its immiscibility with the coating material at the particular coating temperatures. The cover layer may be applied to the inlet portion, the outlet portion, or both inlet and outlet portions of the coating bath.

Various solvents may be used for such cover layers including both aromatic, aliphatic and chlorinated products. These may include toluol, xylol, naphtha, high-boiling ketones, chlorinated hydrocarbons, and mixtures thereof. Also, the cover layer may comprise tricresyl phosphate, dibutyl phthalate, mineral oil and the like.

While only a few embodiments of the invention have been described in detail, it should be apparent that many modifications and changes may readily be made without departing from the spirit and scope of the invention.

What is claimed is:

1. The method of applying a viscous plastic coating to a foraminous base comprising, providing a bath of viscous synthetic plastic coating material, floating a layer of solvent on the surface of said bath, said solvent layer being substantially immiscible with said bath of viscous coating material, passing said base through said solvent layer into said bath and thereafter withdrawing said base from said bath.

2. The method of claim 1 wherein the base is withdrawn from said bath of plastic coating material through said solvent layer.

3. A plastic coated foraminous base made in accordance with the method of claim 1.

4. The method of applying viscous synthetic plastic catings to a foraminous base to obtain a coating tightly adherent to said base and free from gas occlusions, comprising, providing a bath of viscous plastic coating material, having on a surface portion thereof a layer of air-excluding liquid substantially immiscible with said coating material, said air-excluding layer having a viscosity less than that of said coating material, and passing said base through said liquid layer into said bath of coating material, and withdrawing said base from said bath of coating material.

5. The method of claim 4 wherein the base withdrawn from said bath of coating material then passes through said air-excluding layer.

6. A plastic coated foraminous base having openings of at least one-half inch in size made in accordance with the method of claim 4.

7. The method of applying viscous synthetic resin coating to a foraminous sheet comprising providing a coating bath comprising a viscous solution of said resin in a solvent, floating an air-excluding layer of solvent on the surface of said bath, said last-mentioned solvent being substantially immiscible with said resin solution at coating temperatures and continuously passing said sheet through said air-excluding layer, into said resin solution and out of said resin solution.

8. The method of claim 7 wherein said sheet is passed out of said resin and then through and out of said air-excluding layer.

9. The method of coating a foraminous sheet having openings of from about one-quarter to about two inches comprising providing a coating bath comprising a liquid viscous synthetic resin, disposing an air-excluding layer of solvent substantially immiscible with said resin at coating temperatures, on the surface of said bath, and continuously passing said sheet through said air-excluding layer into said resin and withdrawing said sheet from said bath to form a tightly adherent resin coating thereon which spans and closes the openings therein.

10. The method of coating a foraminous sheet comprising passing said sheet successively through a low-viscosity, air-excluding liquid layer and a high-viscosity liquid body of coating resin in surface contact with said liquid layer, said liquid layer being substantially immiscible with respect to said liquid resin at coating temperatures, the viscosity of said coating resin being substantially proportional to the size of the openings in said sheet and the peripheral extent of the sheet material cross-sectional portions defining adjacent openings.

References Cited in the file of this patent

UNITED STATES PATENTS

| Number | Name | Date |
|---|---|---|
| 361,550 | Scarles | Apr. 19, 1887 |
| 370,091 | Scarles | Sept. 20, 1887 |
| 542,393 | Meadows | July 9, 1895 |
| 915,672 | Harrington | Mar. 16, 1909 |
| 1,580,287 | Colle et al. | Apr. 13, 1926 |
| 1,967,268 | Serrington | July 24, 1934 |
| 2,028,670 | Hosking | Jan. 21, 1936 |
| 2,037,893 | Greenan | Apr. 21, 1936 |
| 2,293,855 | Schneider | Aug. 25, 1942 |
| 2,332,373 | Dorough et al. | Oct. 19, 1943 |
| 2,593,553 | Francis | Apr. 22, 1952 |
| 2,676,899 | Hackley | Apr. 27, 1954 |